United States Patent [19]
De Frondeville et al.

[11] Patent Number: 5,735,661
[45] Date of Patent: Apr. 7, 1998

[54] TRANSPORTER FOR STORING AND CARRYING MULTIPLE ARTICLES, SUCH AS COIN COLLECTION BOXES

[75] Inventors: Alexis W. De Frondeville, Somerville, Mass.; Howard M. Citron, South Salem; David K. Asano, Yorktown Heights, both of N.Y.; Jeffrey H. Hahn, Greenwich, Conn.

[73] Assignee: Nynex Science & Technology, Inc., White Plains, N.Y.

[21] Appl. No.: 550,562

[22] Filed: Oct. 31, 1995

[51] Int. Cl.⁶ .................................................. B65G 1/04
[52] U.S. Cl. ........................... 414/276; 193/36; 414/331; 414/286; 414/529
[58] Field of Search .......................... 414/539, 529, 414/276, 331, 286; 193/35 R, 36, 39, 27; 211/162, 151; 312/35

[56] References Cited

U.S. PATENT DOCUMENTS

| | | | |
|---|---|---|---|
| 296,600 | 4/1884 | Norwood | 414/276 |
| 571,389 | 11/1896 | Pancoast | 414/276 |
| 1,632,204 | 6/1927 | Threefoot et al. | 193/36 |
| 3,093,229 | 6/1963 | Scheidenhelm | 193/36 |
| 3,392,813 | 7/1968 | Trautmann | 193/36 |
| 5,236,104 | 8/1993 | Stingel, Jr. et al. | 414/276 X |
| 5,567,103 | 10/1996 | Konstant | 414/276 |

FOREIGN PATENT DOCUMENTS

| | | | |
|---|---|---|---|
| 232503 | 4/1925 | United Kingdom | 193/36 |

*Primary Examiner*—Frank E. Werner
*Attorney, Agent, or Firm*—Michaelson & Wallace; Peter L. Michaelson; Jeremiah G. Murray

[57] ABSTRACT

A mobile article transporter for carrying and storing a plurality of similar articles in a compact configuration. The transporter comprises a plurality of relatively friction-free conveyors located one above the other. Each conveyor includes a set of rollers that lie in an inclined plane along which the articles gravitate. Alternate ones of the conveyors tilt in opposite directions to form a Z-shaped structure through which the articles cascade to load the transporter from the bottom up. Pivoted article transfer carriages mount in the transporter for transferring articles between adjacent conveyors. The transfer carriages include guide arms and control arms that direct articles from an upper conveyor to the next lower conveyor. When the lower conveyor is filled with articles, the uppermost article thereon abuttingly engages the guide arms to prevent rotation of the transfer carriage, thereby preventing articles from gravitating onto the full conveyor. Articles may be loaded or unloaded from any point on the transporter or from a single point at either end of the transporter.

18 Claims, 7 Drawing Sheets

TRANSPORTER FOR STORING AND CARRYING MULTIPLE ARTICLES, SUCH AS COIN COLLECTION BOXES

BACKGROUND OF THE INVENTION

1. Field of the Invention

The invention relates to article transporters, and, more particularly, to mobile apparatus for carrying and storing a plurality of similar articles in a compact configuration.

2. Description of the Prior Art

One of the most critical problems confronting designers of coin-operated machines has been providing efficient techniques for collecting the coin revenues accumulated in the coin receptacles found in such machines. The coin receptacles of many coin-operated machines, such as pay telephones, comprise sealed coin collection boxes that must be manually removed from their coin machines and loaded onto racks or mobile transporters for conveyance to coin counting and sorting facilities.

Generally, the process of collecting revenues from pay telephones involves removing and gathering coin boxes from the telephones, transporting the boxes to coin collection facilities, and then distributing the boxes to operators who manually empty their contents into automatic coin counting machines. When a collector removes a coin box from a pay telephone, the collector normally replaces it with an empty one and stacks the loaded box onto a storage rack and/or transporter. The collector then trucks the racks and/or transporters to a main collection center or to consolidation centers where the boxes may be placed on larger transporters for later transfer to the main collection center. Unloaders at the main collection centers must hand feed the coin boxes from their transporters or racks onto conveyor systems which distribute the boxes to counting stations for processing. An operator then opens each box, dumps its contents into a sorter-counter, and resets its security seal before returning the, now empty, box to the conveyor system. At the output end of the conveyor system, loader personnel manually restack the empty boxes onto the racks or transporters in which these boxes are temporarily stored for later use by collectors during the box collection process described above.

Those concerned with the development of automated systems for processing coin collection boxes have long recognized the need for improved coin box transporters capable of interfacing with automated loading equipment. Various types of coin box transporters, having a variety of different sizes and shapes, have been used in the past. However, such prior art transporters were primarily designed for use in systems that are essentially manual. Although such prior art transporters have served the purpose, they have proved to be unsuitable for use with fully automated coin collection systems.

The design efforts of most prior art transporters were primarily directed toward achieving the goal of storing the coin boxes in a compact volume and/or in a highly secure manner. Little attention was focused toward effectively interfacing the transporters with the loader personnel and/or the conveyor systems. In many prior transporters, the boxes must be manually loaded into or removed from narrow slots at different locations. In other instances, the rack or transporter must be moved or rotated to provide access to the boxes as they are being loaded and unloaded. These and other characteristics make most prior art box storage apparatus ineffective for use with automated systems that use mechanical loaders and unloaders.

Although there has been a long recognized need for improvements in coin box transporters, no practical apparatus has yet been devised that mitigates these problems. Ideally, coin box transporters would be capable of being loaded and unloaded manually or mechanically at a single point or multiple points; would operate passively, automatically feeding boxes from its input to output without the need of providing power, manual or otherwise; would be capable of temporarily storing multiple boxes in a minimal volume; would be simple in construction and would be dependable in operation. Until now, this need has remained unfilled.

SUMMARY OF THE INVENTION

Through the present invention, we have overcome the deficiencies inherent in the art.

In particular, the invention is an apparatus for holding a plurality of similar articles in a compact configuration. The apparatus includes a plurality of article-supporting shelves mounted one above the other in a framework. At least one article transfer mechanism mounts in the framework for transferring articles between the shelves. The shelves comprise article conveyors having relatively friction-free, article-supporting surfaces. Each surface lies in an inclined plane along which the articles gravitate. Alternate ones of the surfaces tilt in opposite directions to form a Z-shaped configuration through which the articles cascade.

The transfer mechanism includes a guide arm for directing articles from one of the surfaces to the next lower surface, and a control arm that prevents articles from gravitating onto the next lower surface when that surface is backed up with articles. The guide arm and the control arm are angularly fixed to each other. While the guide arm pivotally extends between surfaces, the control arm selectively engages articles located at the lower end of the upper shelf. A tilt guide mounts on the framework and includes a surface for deflecting articles toward the guide arm.

Another aspect of the invention is directed to a mobile transporter for carrying and storing a plurality of similar articles. The transporter comprises a conveyor system having a plurality of article conveyors mounted one above the other. Article transfer carriages mount on the transporter for transferring articles between adjacent conveyors. Each conveyor includes a set of rollers arranged in an inclined plane along which articles gravitate. Alternate conveyors tilt in opposite directions to form a Z-shaped structure that permits articles to cascade down through the conveyor system. The transfer carriages include guide arms for engaging the articles when they gravitate between adjacent conveyors and for directing these articles into a proper orientation on the conveyor. The transfer carriages also include control arms for preventing articles from gravitating onto a full conveyor in response to the guide arms engaging articles backed up on the full conveyor. Tilt guides mount on the transporter and include surfaces for deflecting the articles toward the guide arms.

More specifically, the invention includes a mobile article transporter comprising a plurality of relatively friction-free conveyors located one above the other. Each conveyor includes a set of rollers that lie in an inclined plane along which the articles gravitate, and with alternate ones of the conveyors tilted in opposite directions to form a Z-shaped structure through which the articles cascade to load the transporter from the bottom up. Article transfer carriages mount on the transporter for transferring gravitating articles between adjacent conveyors. The transfer carriages include guide arms and control arms that direct gravitating articles from an upper conveyor to the next lower conveyor. When the lower conveyor is full, the uppermost article thereon engages the guide arms to prevent rotation of the transfer carriage, thereby preventing articles from moving onto the full conveyor. Articles may be loaded or unloaded from any point on the transporter or from a single point at either end of the transporter.

BRIEF DESCRIPTION OF THE DRAWINGS

The teachings of my invention can be readily understood by considering the following detailed description in conjunction with the accompanying drawings, in which.

DETAILED DESCRIPTION OF THE PREFERRED EMBODIMENT

Figure 1:
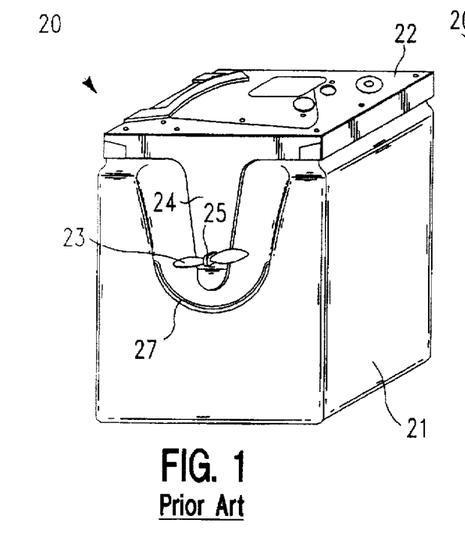
FIG. 1 is a pictorial view of a prior art pay telephone coin box with its lid sealed closed.
Figure 2:
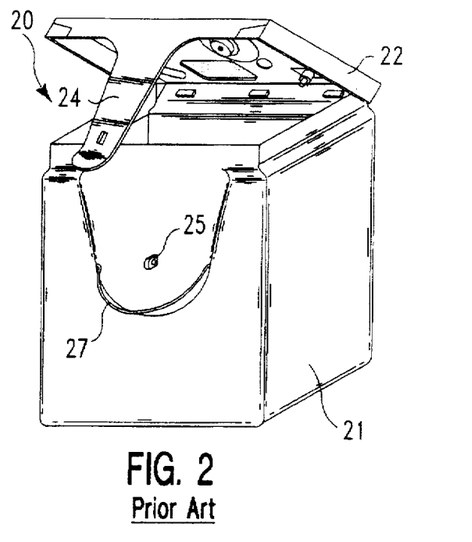
FIG. 2 is a pictorial view of the prior art coin box of FIG. 1 with its lid open.

Referring now to the drawings, FIGS. 1 and 2 depict a typical prior art telephone coin collection box 20 comprising body 21 and hinged lid 22. The structure of box 20, as shown in the present drawings, corresponds to the design of a well-known type of coin collection box that has been used for many years in the telephone industry. As such, coin collection boxes similar in structure to box 20 can be found in significant numbers in pay telephones throughout the United States and elsewhere. It is to be understood, therefore, that the specific structure of box 20 is only illustrative, and generally portrays a type of article suitable for use with the preferred embodiment of our present invention.

Figure 4:
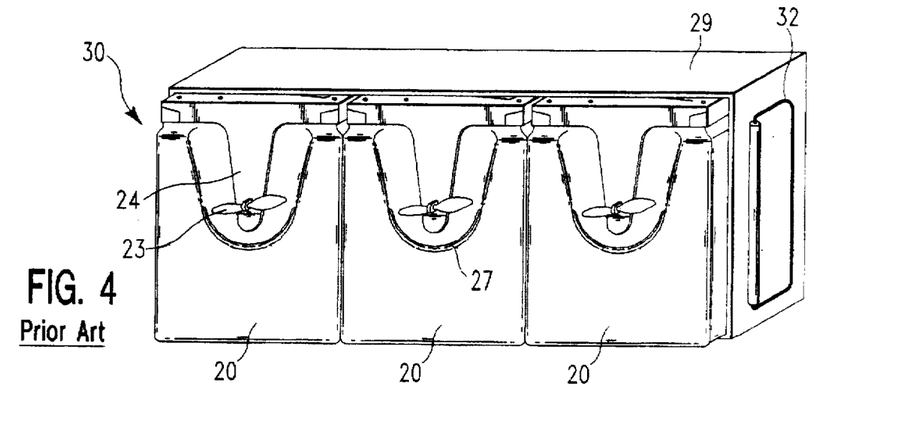
FIG. 4 is a pictorial view illustrating a prior art coin box package made up of three coin boxes stored in a tray of the type shown in FIG. 3.

As seen in FIGS. 1, 2 and 4, lid 22 includes slotted hasp 24 which, when lid 22 is pressed into its closed position, mates with annular catch 25. Each of boxes 20 generally includes security seal 23 that locks corresponding lid 22 in its closed position to deter tampering with the contents of the corresponding box before processing. Lid 22 is sealed in its closed position by inserting a thin plastic rod (not shown) into annular catch 25 and heat setting the rod to form the enlarged security seal 23 seen in FIGS. 1 and 4. U-shaped pull handle 27 hinges to the front wall of box 20 and normally hangs loose below catch 25 when box 20 sits in its upright position as shown in FIG. 1.

Figure 3:
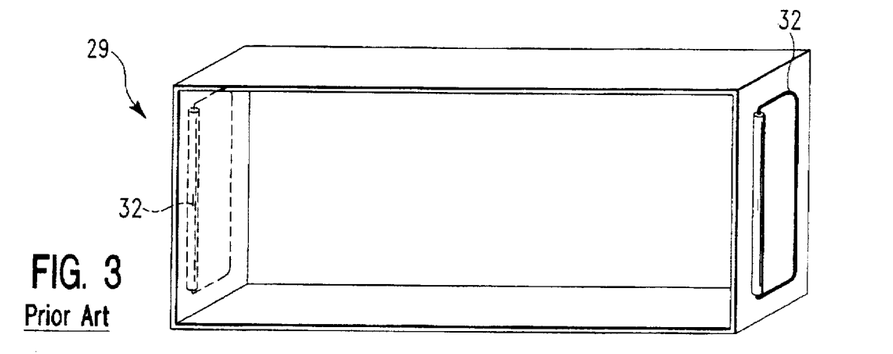
FIG. 3 is a pictorial view of a prior art coin box tray for holding coin boxes of the type shown in FIGS. 1 and 2.

Coin box collectors typically receive empty coin boxes 20 from inventory in the manner shown in FIGS. 1 and 4, i.e., with lids 22 closed, with security seal 23 fixed and set in catch 25, and with three empty coin boxes 20 packaged in coin box tray 29, also shown in empty form in FIG. 3, to form coin box package 30. Boxes 20 are generally placed in tray 29 with their front faces fully exposed, in the manner shown in FIG. 4, so that box collectors can easily access pull handles 27. When collecting loaded boxes 20, a coin box collector typically unlocks the telephone compartment in which a coin receptacle is located and pulls coin box 20 from the compartment using pull handle 27. The collector then places the collected coin box 20 into tray 29 with its front face fully exposed in the manner shown in FIG. 4. It is noted that in some cases, e.g., box 20 is visibly damaged or its seal 23 is broken, or the like, box collectors may place box 20 upside down in tray 29. Manual or mechanical inspectors detect this upside-down condition at the collection center and remove these boxes for special handling.

Using tray handles 32, box collectors normally stack loaded coin box packages 30 into racks and/or transporters when conveying them to box processing stations. Before being processed, boxes 20 are removed from their trays 29 and their security seals 23 dislodged. Operators then open lids 22 and dump the contents of box 20 into coin counting machines. The operators then close lids 22, and insert and set new security seals 23. Next, they place the empty boxes 20 back into trays 29 to form coin box packages 30. Loaders then stack these new packages 30 onto racks and/or transporters, holding them in inventory for later use by box collectors.

FIGS. 5–8 illustrate a preferred embodiment of transporter 40 constructed in accordance with the principles of the present invention. Transporter 40 forms a mobile apparatus capable of carrying and storing a plurality of coin box packages 30, or similar articles, in a compact, tiered configuration. Transporter 40 includes a plurality of inclined conveyors 61 vertically arranged in framework 39. Conveyors 61 form a vertical conveyor system that permits packages 30 to cascade down through transporter 40, filling it from the bottom up, regardless of where each package 30 was originally placed on conveyors 61. Transfer carriages 37 help packages 30 transfer from one conveyor 61 to the next lower conveyor 61.

Figure 5:
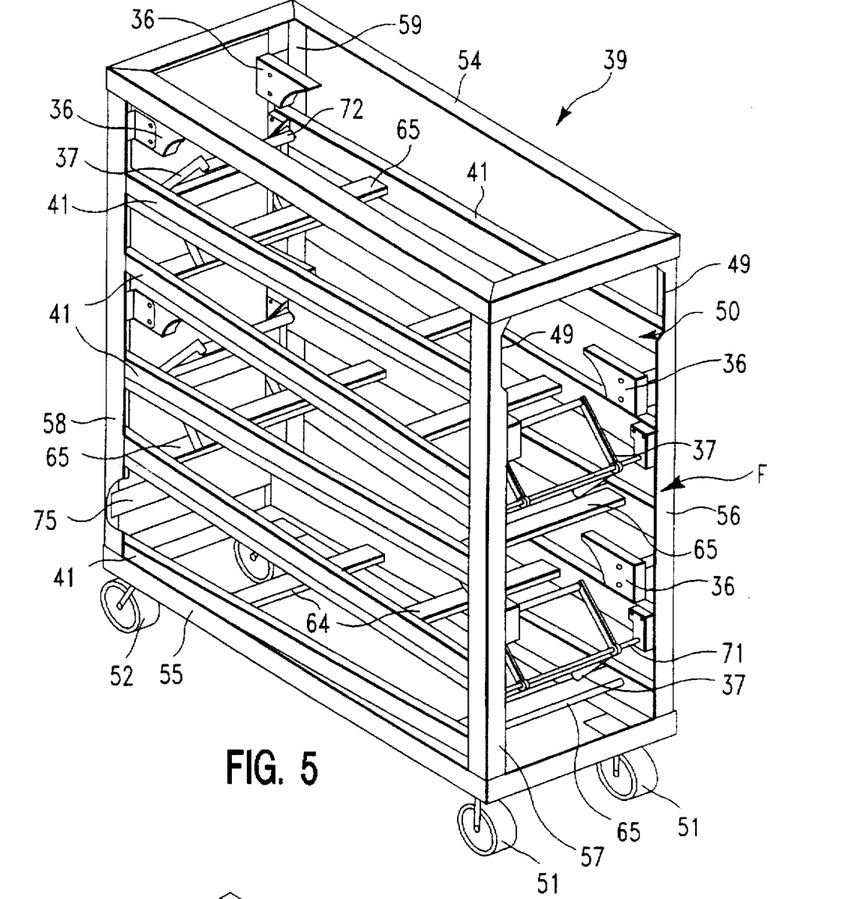
FIG. 5 is a pictorial view, with parts broken away, of a framework for a transporter made in accordance with the present invention for holding coin box packages of the type shown in FIG. 4.

As best seen in FIG. 5, framework 39 includes rectangular upper frame 54 and lower frame 55. Four upright, parallel corner posts 56–59 fix frames 54 and 55 in spaced, parallel relation to form a box-like structure with an open interior in which five conveyors 61 mount (see FIG. 8). Frames 54 and 55, and posts 56 and 57 form front face F, while frames 54 and 55, and posts 58 and 59 form the opposed rear face R of transporter 40.

To provide mobility to transporter 40, four wheels support framework 39. Front wheels 51 attach to the underside of frame 55 at its front corners near front face F. Rear swivel wheels 52 attach to the underside of frame 55 at its rear corners near rear face R.

Figure 6:
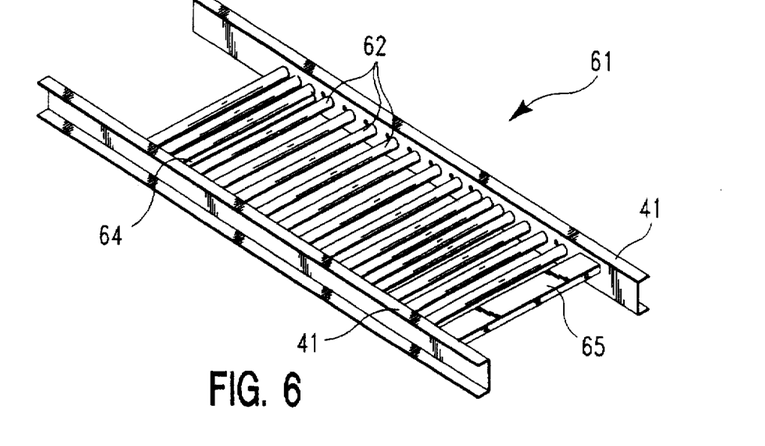
FIG. 6 is a pictorial view of a conveyor that mounts in the framework of FIG. 5.

FIG. 6, a pictorial representation of conveyor 61, shows a plurality of rollers 62 pivotally supported in a conveyor framework made up of support beams 41, and crossbars 64 and 65. Support beams 41 extend between and attach to posts 57 and 58 (see FIGS. 5 and 8) on the right side, and posts 56 and 59 on the left side of transporter 40. Support beams 41 alternately slope between front face F and rear face R such that five inclined conveyers 61 mount in framework 39 to form a Z-shaped pattern. Consequently, each conveyer 61 provides a inclined planar surface on which packages 30 can freely slide with little friction under their own weight. Conveyers 61 each mount at a different one of conveyer levels A–E, with level A being located at the lowest elevation of transporter 40 and levels B–E being vertically located at progressively higher elevations. Crossbars 64 and 65 provide rigidity by bracing corresponding inclined support beams 41 at several points.

Figure 8:
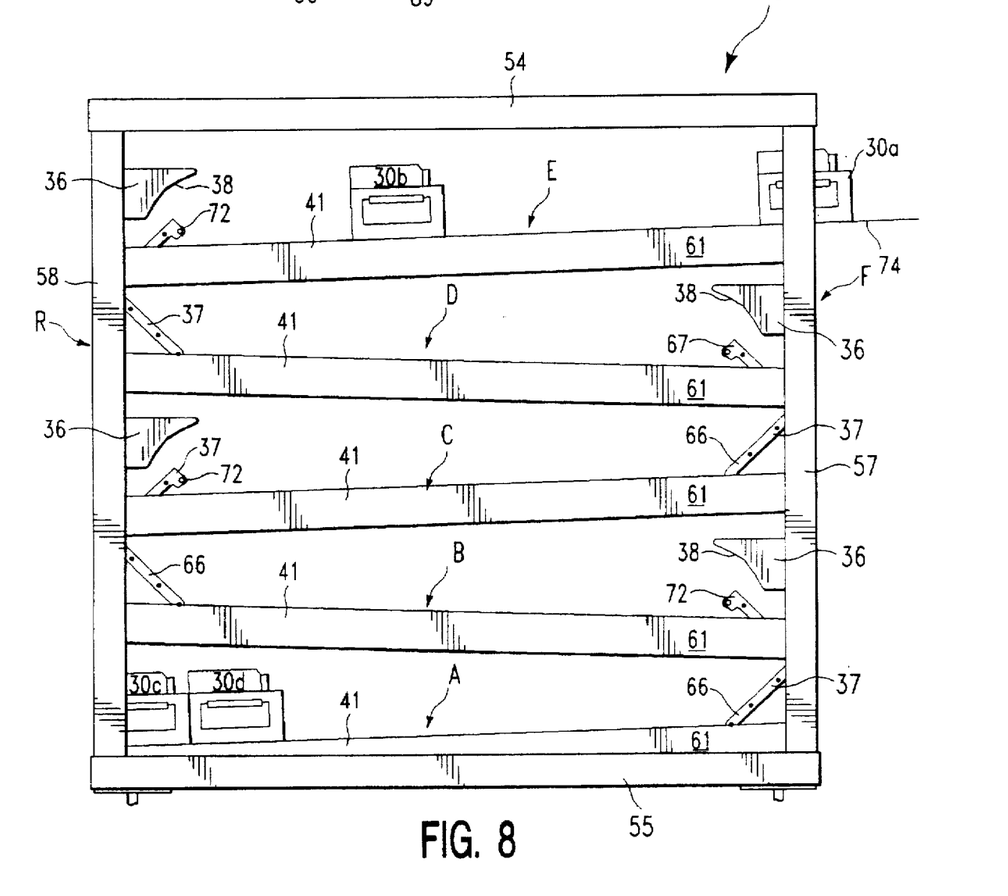
FIG. 8 is a side elevation, with parts broken away, of a preferred embodiment of the transporter holding a plurality of coin box packages of the type shown in FIG. 4.

Notches 49, located near the top of posts 56 and 57, form input passage 50 through which coin box packages 30 may be loaded onto the uppermost conveyer 61 of transporter 40 in the manner depicted by coin box package 30a in FIG. 8. Of course, packages 30 may be placed onto any conveyer 61 via the sides of transporter 40.

Pivoted transfer carriages 37 (one of which is specifically shown in FIG. 7) and tilt guides 36 also mount on framework 39 near the opposed ends of support beams 41. Axles 71 pivotally support transfer carriages 37 at the low ends of support beams 41 at conveyor levels B–E. Tilt guides 36 attach to respective posts 56–59 (see FIG. 4) so as to be located on either side of and slightly above their corresponding transfer carriage 37. Transfer carriages 37 and tilt guides 36 form transfer mechanisms which help transfer coin box packages 30 as they cascade between conveyors 61 at successive conveyor levels A–E.

Figure 7:
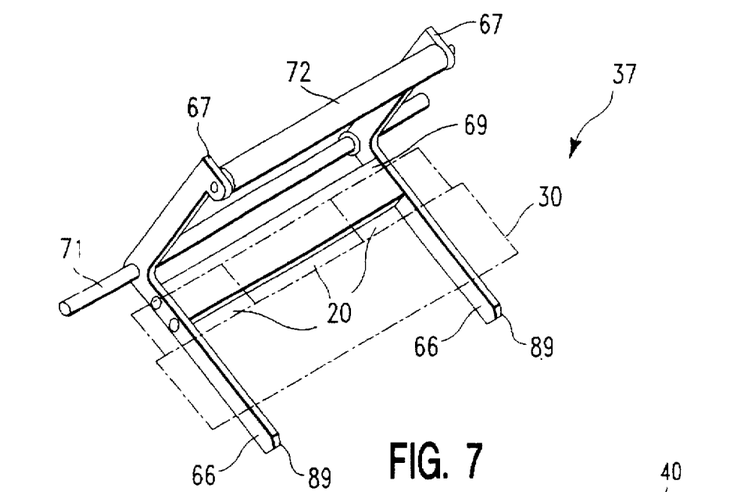
FIG. 7 is a pictorial view of a transfer carriage that forms a portion of the apparatus shown in FIG. 5.

Each transfer carriage 37, illustrated in detail in FIG. 7, includes two support arms 66 fixed in a common plane and at right angles to two control arms 67. Crossbar 69 attaches to support arms 66 to provide rigidity. Roller 72 pivotally mounts to the ends of control arms 67. As indicated by phantom outline in FIG. 7, the spacing between corresponding support arms 66 permits the side of a coin box package 30 to be supported thereon with the center one of the coin boxes 20 located directly over crossbar 69 while the outer coin boxes 20 lie over support arms 66. Additionally, crossbars 65 are located on conveyors 61 so that arms 66 normally rest thereon. However, since the upper end of the level E conveyor 61 does not associate with a transfer carriage 37, no crossbar 65 is provided. Instead, rollers 62 extend to the upper end of the level E conveyor 61 to facilitate input passage 50.

When properly placed on an inclined conveyor 61 at one of levels A–E, coin box packages 30 will freely slide, on rollers 62, under the influence of their own weight until these boxes reach a stable position on transporter 40. Generally, packages 30 come to rest at one of the following positions: first, resting against crossbar 75 at the lowest point of level A; second, resting against another package 30 that is at rest; and third, resting against roller 72 of a carriage 37 that cannot rotate because its arms 66 engage a package 30 that is located on a full conveyor 61. For example, FIG. 8 shows stationary packages 30c and 30d which have gravitated to the lowest point of transporter 40, i.e., the low end of level A. Package 30c rests against crossbar 75 and supports package 30d. Package 30b, located on the highest level E, is unstable and will, therefore, gravitate down toward the low end of conveyor 61 on level E. Package 30b will cascade down through successive levels A–E until it comes to rest against package 30d on level A. Transfer carriages 37 and tilt guides 36 will guide package 30d as it cascades down between each of levels A–E.

Figure 9:
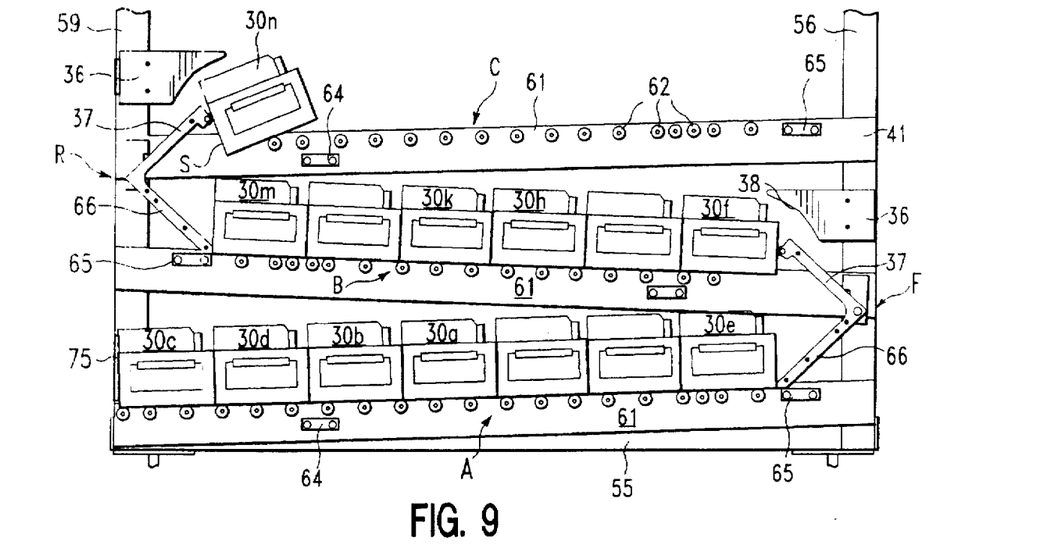
FIGS. 9–15 are each respective side elevations with parts broken away, similar to the view of FIG. 8, which illustrate the operation of the preferred embodiment.
Figure 10:
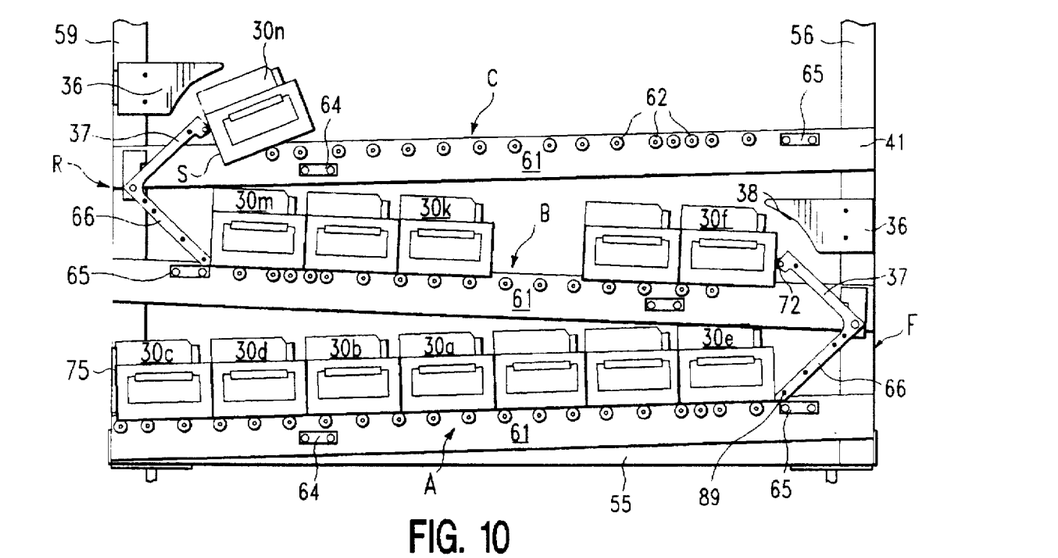
Figure 11:
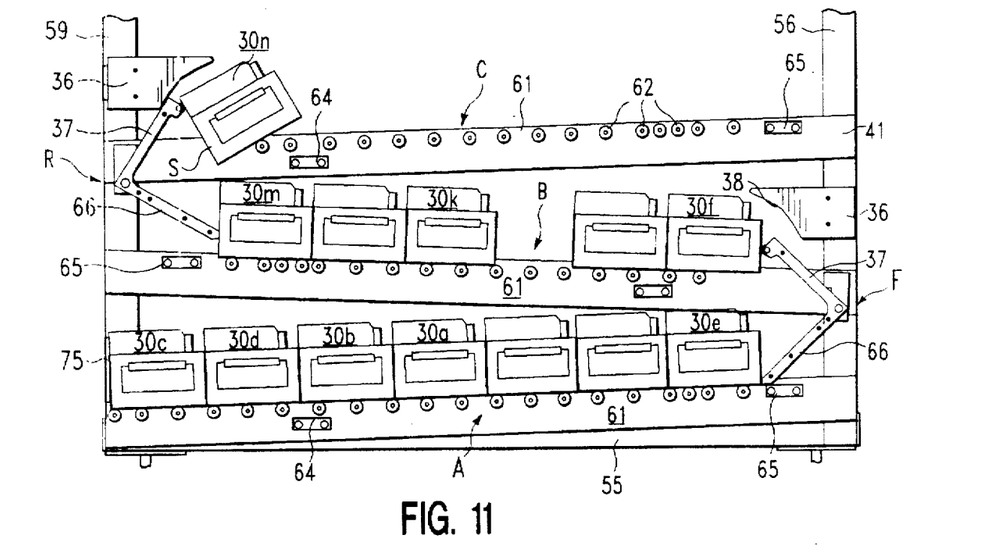
Figure 12:
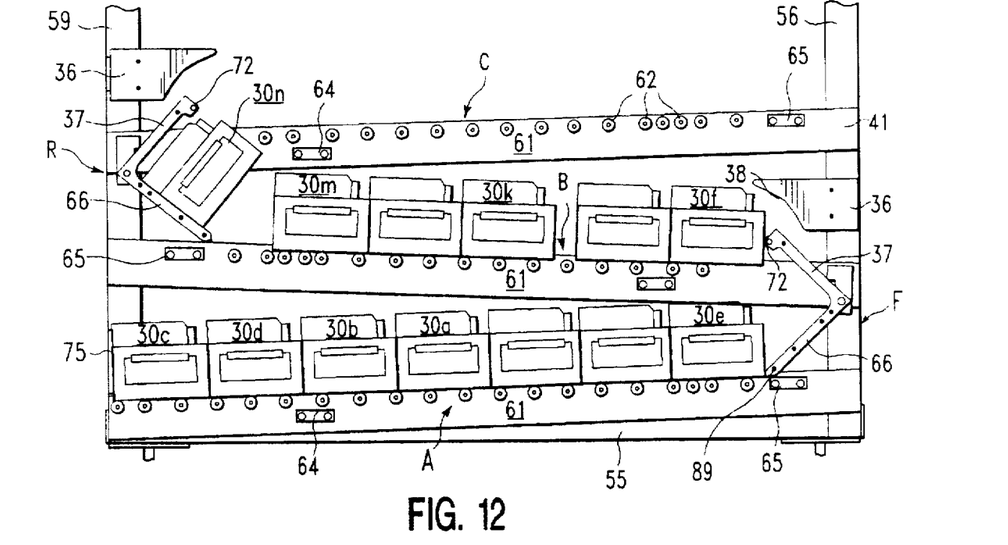
Figure 13:
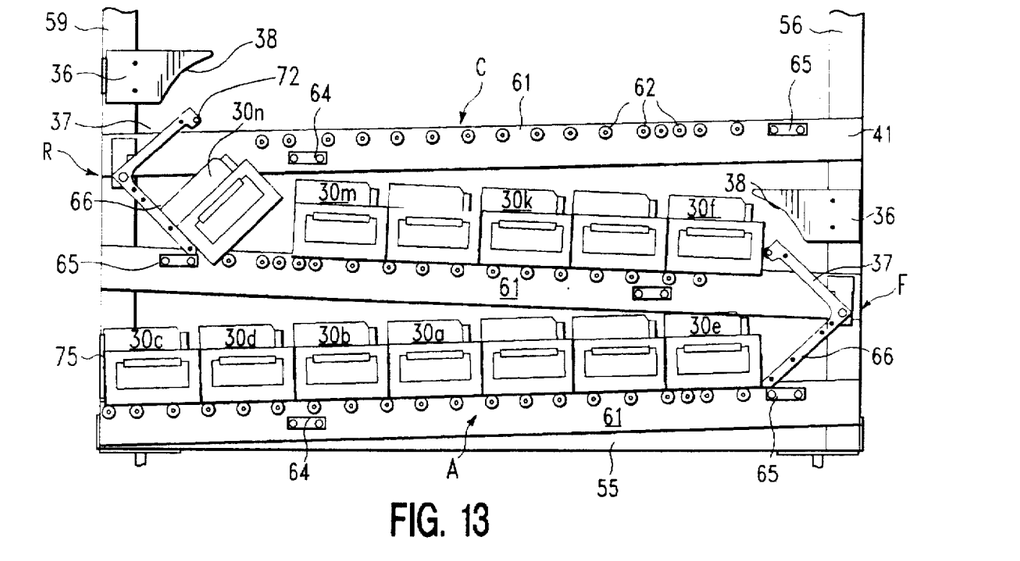
Figure 14:
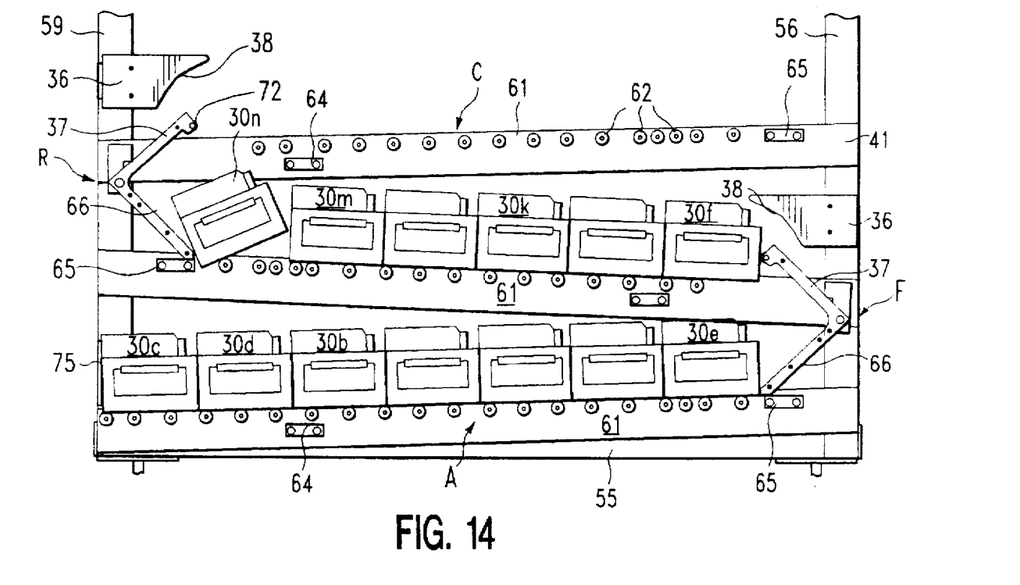
Figure 15:
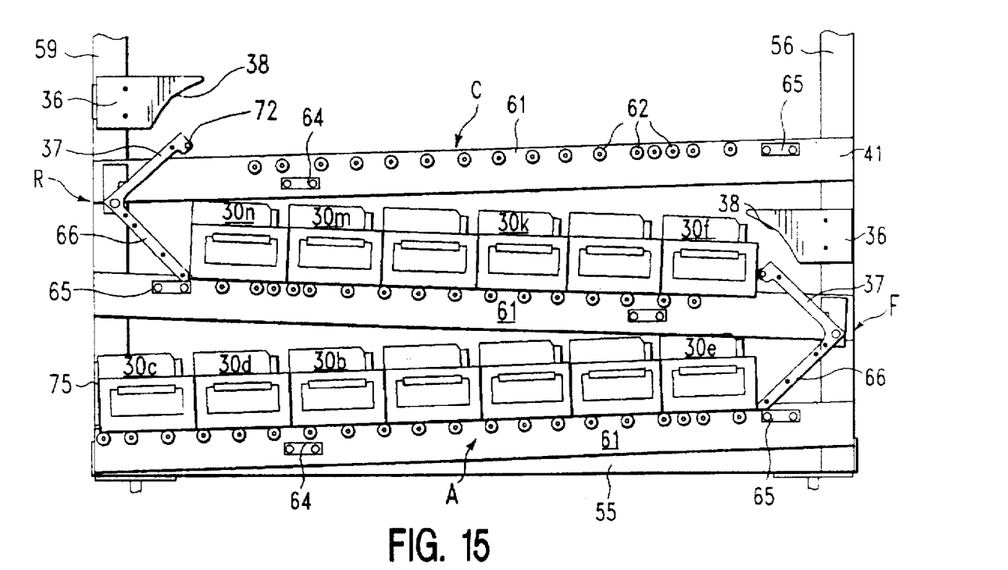

When a particular conveyor 61 fills with packages 30, the last package 30 on that conveyor will abuttingly engage support arms 66 of transfer carriage 37, thereby preventing that transfer carriage 37 from rotating when a subsequent package 30 at the next higher level engages roller 72 of that carriage. For example, FIG. 9 shows conveyor 61 on level A filled with packages 30 such that package 30e abuts against and along a lower vertical edge 89 (only one of which is shown in FIG. 10, but two are shown in FIG. 7 for a carriage) of arms 66, thus essentially fully engaging these arms (along these edges) of the transfer carriage 37 located between levels A and B. Consequently, that transfer carriage 37 will prevent movement of package 30f and all other packages on the level B conveyor 61. In like manner at level B, package 30m abuttingly engages arms 66 to prevent rotation of the transfer carriage 37 located between levels B and C, thereby preventing package 30n from gravitating onto the level B conveyor 61. In the event a slight space should exist between, e.g., package 30m, and arms 66, then as that carriage starts to rotate counterclockwise, edges 89 of that arm will eventually abuttingly engage with a side of package 30m thereby preventing further rotation of this carriage until such time as package 30m moves down B level conveyor 61.

As mentioned above, packages 30 may be placed at the upper end of the level E conveyor 61 via input passage 50, as depicted by package 30a in FIG. 8. This loading mode is best suited for use with conveyors, mechanical loaders, and other types of automated systems. In this regard, transporter 40 may simply be rolled next to the output of a feed conveyor, for example, so that the upper end of the level E conveyor 61 aligns therewith (schematically depicted in FIG. 8 with phantom line 74). Mechanical and/or manual loaders may also pass one or more packages 30 directly through either side of transporter 40 for placement onto any unoccupied position on any conveyor 61. In like manner, one or more packages 30 may be simultaneously removed from either side of any one of conveyors 61 at any one of levels A–E. The relatively open sides of transporter 40 also provide easy access for inspectors or loaders who may need to adjust improperly positioned packages 30.

FIGS. 9–15 illustrate the operation of transporter 40 in response to the removal of package 30h from the level B conveyor 61. Removal of package 30h from conveyor 61 causes package 30k to move into the space left by package 30h (see FIG. 10). As a consequence, all packages 30 located at higher elevations will also become unstable and gravitate to lower positions. As package 30m gravitates along the level B conveyor 61, the transfer carriage 37 that spans levels B and C rotates counterclockwise, as viewed in FIG. 10, such that its roller 72 rolls on side S of package 30n (see FIG. 11). The angled downward movement of package 30m falling into transfer carriage 37 causes roller 72 to rotationally slide upward along side S, hence further exposing the transfer carriage to this package. When side S of package 30n clears roller 72, package 30n by its own weight and momentum will simply tilt over and fall onto transfer carriage 37 such that side S rests on arms 66 and crossbar 69 (see FIGS. 7 and 12). The weight of package 30n will now cause transfer carriage 37 to reverse direction and rotate clockwise until arms 66 abut and rest on the crossbar 65 on the level B conveyor 61 (see FIG. 13). At this point, package 30n slides down and off arms 66, engages roller 62 (see FIG. 13) and tips right-side-up onto the level B conveyor 61 (see FIGS. 14 and 15).

Figure 16:
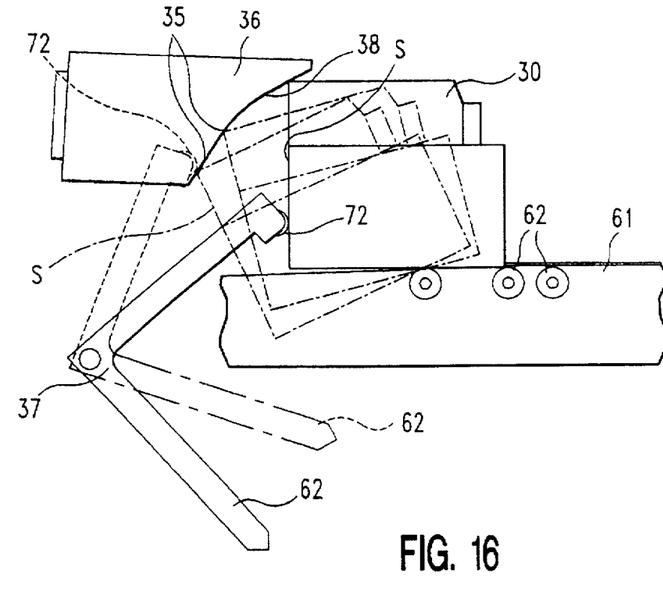
FIG. 16 is a side elevation showing multiple positions of a portion of the preferred embodiment.

FIG. 16 illustrates the function of tilt guides 36 in deflecting packages 30 to insure their proper transfer. Tilt guides 36 operate in situations where packages 30 travel on conveyors 61 with significant momentum. As can be seen from the previous examples, proper package transfer requires that packages 30 tilt over onto their sides and fall onto arms 66 when entering and being directed by transfer carriages 37. In most instances, packages 30 will properly tilt under their own weight onto arms 66 during transfer without engaging tilt guides 36. However, in situations where packages 30 travel on conveyor 61 with significant momentum, due to their weight and velocity, it may be necessary to force packages 30 to tilt properly onto arms 66. As illustrated in FIG. 16, tilt guides 36 have curved guiding surfaces 38 that engage the upper, leading edge 35 on either side of package 30. As surface 38 tilts package 30 (see dashed lined multi-images in FIG. 16), roller 72 rolls on side S of package 30 until leading edge 35 clears roller 72. At this point, side S of package 30 falls onto arms 62 and the transfer process completes as described above.

Obviously many modifications and variations of the present invention are possible in the light of the above teachings. For example, while it is contemplated that packages 30 may be accessed through the sides of transporter 40 and, therefore, removed manually and/or mechanically from any point on transporter 40, those skilled in the art will recognize that crossbar 75 may be easily removed to provide an output passage at the low end of the level A conveyor 61, making it possible to simply feed packages 30 directly onto another conveyor much the same way that package 30a feeds onto the level E conveyor 61 in FIG. 8. It is also contemplated that an article dispensing device may selectively separate one or more packages 30 from the end of the level A conveyor 61. Likewise, mechanical unloaders may pull one or more packages 30 from any one or more locations on either side of transporter 40. In accordance with the present invention, those skilled in the art may readily design tiered transporters with an assortment of lengths and heights, thereby accommodating a wide variety of different types and numbers of articles. It is to be understood, therefore, that within the scope of the appended claims, the invention may be practiced otherwise than as specifically described.

What is claimed is:

1. A tiered article transporter for carrying and storing a plurality of similar articles in a compact configuration comprising:

a transporter framework;

transport means connected to said framework for enabling manual movement of said transporter;

a conveyor system comprising a plurality of article conveyors mounted one above the other in said framework; and article transfer carriages mounted in said framework, each said carriage having article transfer means for directing articles between adjacent ones of said conveyors, each said article transfer means comprising control means and guide means, each said control means spaced from and extending toward the end of one of said conveyors for engaging one of said articles on a corresponding one of said conveyors to block forward movement of said articles and for selectively permitting said one of said articles to tilt forwardly and tumble below an end of said corresponding one of said conveyors, and said guide means spaced below said corresponding one of said conveyors for intercepting said articles as they tumble and for guiding said articles onto an adjacent one of said conveyors.

2. The transporter of claim 1 wherein each said conveyor includes a set of rollers arranged in an inclined plane along which said articles gravitate, and with alternate ones of said conveyors tilted in opposite directions to form a Z-shaped configuration through which said articles cascade down through said conveyor system.

3. The transporter of claim 2 wherein said guide means includes means for causing said articles to tilt forwardly onto said adjacent one of said conveyors.

4. The transporter of claim 3 wherein said guide means includes means, responsive to said guide means intercepting one of said articles, for causing said control means to selectively block forward movement of said articles.

5. The transporter of claim 4 wherein said control means is spaced from said conveyors such that a substantial portion of a bottom face of said articles extend beyond the end of said conveyors when said control means blocks forward movement of said articles.

6. The transporter of claim 5 wherein said guide means includes means, responsive to said guide means disengaging said articles, for activating said control means to permit said one of said articles to tilt forwardly and tumble below an end of said corresponding one of said conveyors.

7. The transporter of claim 6 wherein said article transfer carriages each comprise a guide arm and a control arm angularly fixed to each other and connected to said framework with a pivot, said guide arm extending from said pivot below said end of said corresponding one of said conveyors, and said control arm extending from said pivot such that the end of said control arm extends above said end of said corresponding one of said conveyors and said articles pass below said end of said control arm when said articles tilt forwardly and tumble below said end of said corresponding one of said conveyors.

8. The transporter of claim 7 further comprising a tilt guide mounted on said framework, said tilt guide having a surface located above said end of said corresponding one of said conveyors and oriented to forwardly tilt said articles toward said guide arm.

9. The transporter of claim 8 wherein said transport means includes wheels supporting said framework to enable said manual movement of said transporter.

10. Apparatus for holding a plurality of similar articles in a tiered compact configuration, each said article having a bottom face and side faces, said apparatus comprising:

a framework;

a plurality of article-supporting shelves mounted one above the other in said framework, each said shelf tilted into an inclined plane for supporting said articles on their bottom faces in a sliding manner, each said shelf having a high end and a low end between which said articles gravitate, and alternate ones of said shelves tilting in opposite directions to form a Z-shaped configuration through which said articles cascade; and at least one article transfer carriage mounted in said framework, said article transfer carriage located adjacent the low end of an upper one of said shelves and the high end of a lower one of said shelves, said article transfer carriage having control means and guide means, said control means spaced from said shelves for blocking forward movement of said articles on said upper one of said shelves and for selectively permitting a first one of said articles to tilt forwardly and tumble below said low end of said upper one of said shelves, and guide means spaced below said upper one of said shelves for intercepting said articles as they tumble by engaging a side face of said articles and for guiding said articles onto said high end of said next lower one of said shelves.

11. The apparatus of claim 10 wherein said guide means includes means for causing said articles to tilt forwardly with the bottom face of said articles supported on said high end of said next lower one of said shelves.

12. The apparatus of claim 11 wherein said guide means includes means, responsive to said articles engaging said guide means, for causing said control means to engage the forward side face of an article on said low end of said upper one of said shelves to block forward movement of said articles on said upper one of said shelves.

13. The apparatus of claim 12 wherein said control means is spaced from said shelves such that a substantial portion of the bottom face of one of said articles partially extends beyond said low end of said upper one of said shelves when said control means engages said forward side face of said one of said articles.

14. The apparatus of claim 13 wherein said guide means includes means, responsive to said guide means disengaging said articles, for causing said control means to disengage said forward side face of said article to permit said article to tilt forwardly and tumble below said low end of said upper one of said shelves.

15. The apparatus of claim 14 wherein said article transfer carriage comprises a guide arm and a control arm angularly fixed to each other and connected to said framework with a pivot, said guide arm extending below said upper one of said shelves, and said control arm extending from said pivot such that the end of said control arm is located above said low end of said upper one of said shelves and said articles pass below said end of said control arm when said articles tilts forwardly to tumble below said low end of said upper one of said shelves.

16. The apparatus of claim 15 further comprising a tilt guide mounted on said framework, said tilt guide having a surface located above said low end of said upper one of said shelves and oriented to forwardly tilt said articles toward said guide arm.

17. The apparatus of claim 16 wherein said shelves comprise article conveyors.

18. The apparatus of claim 17 wherein said article conveyors have article-supporting surfaces that exhibit reduced friction to movement of the articles thereon.

* * * * *